May 18, 1965 R. M. BLONIARZ 3,184,681

APPARATUS AND METHOD FOR THE GENERATION OF PURE QUADRATURE SIGNALS

Filed Aug. 3, 1962 3 Sheets-Sheet 1

RICHARD M. BLONIARZ by: Homer R. Montague
atty.

Fig. 2 – CAL. POS. A
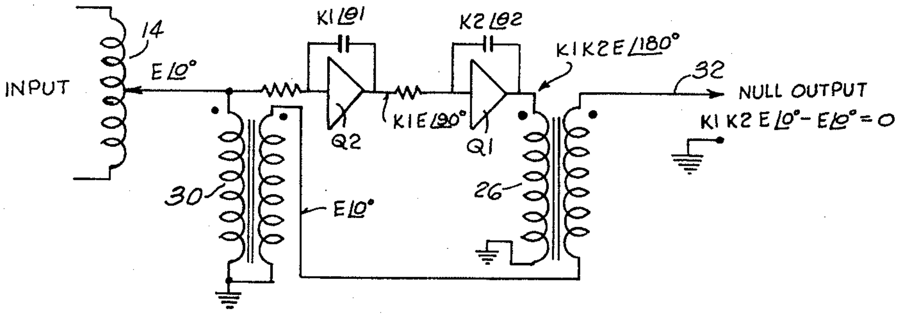
Fig. 3 – CAL. POS. B
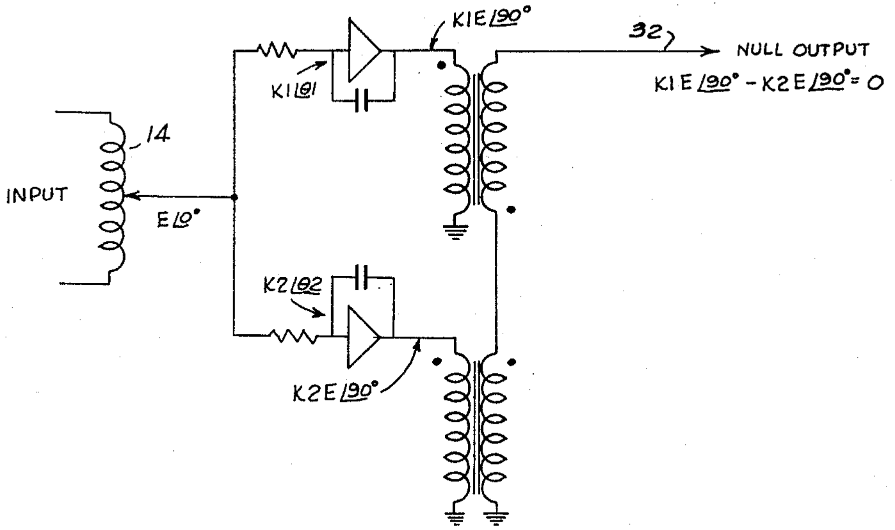
Fig. 4 – OP. POS. C
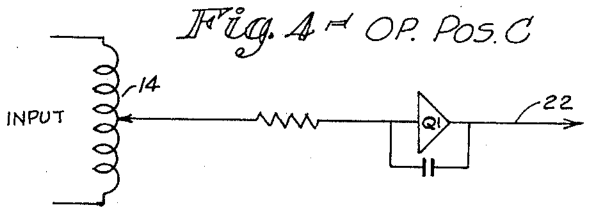

May 18, 1965 R. M. BLONIARZ 3,184,681

APPARATUS AND METHOD FOR THE GENERATION OF PURE QUADRATURE SIGNALS

Filed Aug. 3, 1962 3 Sheets-Sheet 3

3,184,681

APPARATUS AND METHOD FOR THE GENERATION OF PURE QUADRATURE SIGNALS

Richard M. Bloniarz, Los Angeles, Calif., assignor, by mesne assignments, to The Singer Company, New York, N.Y., a corporation of New Jersey Filed Aug. 3, 1962, Ser. No. 214,543
9 Claims. (Cl. 324—83)

The present invention provides an apparatus that is capable of producing an output signal identical to an applied input signal but having precisely a quadrature phase position relative to that input signal.

It is often required to generate a voltage output that is shifted in phase with respect to voltage input by an angle of precisely ninety degrees. If this is accomplished, the output is said to be in quadrature with the input. Heretofore, it has been difficult and inconvenient to produce an output signal that differs from the input by a phase angle of precisely ninety degrees, especially where the wave form of the input signal is more or less arbitrary. The invention provides a self calibrating unit that achieves this to within a tolerance of 0.01 degree of phase angle, or better.

Therefore, it is the principal object of the present invention to provide a substantially self-contained apparatus for obtaining a precise phase shift of 90 degrees, and a method for calibrating such apparatus to that end.

Another object it to provide such an apparatus with convenient function-selecting switches to make the necessary internal connections for calibration purposes, and likewise to alter the reference phase supplied to a phase-sensitive null indicator.

A further object is to provide such an apparatus which uses transformers selectively connectable for the purpose of comparing or combining the outputs of the apparatus channels in proper relation for the succession of calibrating operations.

Still another object is to provide for the use of ganged quadrature networks for rapid switch selection of the proper frequency range to match a particular input signal.

Briefly, the objects and advantages of the invention are achieved by means of an apparatus providing first and second 90 degree phase shifting circuits composed of phase-shifting amplifiers (preferably integrating amplifiers), switching means for connecting those amplifiers selectively in cascade or in parallel with respect to an input terminal, output combining means, a reference amplifier, and a phase sensitive null detector connected to the amplified outputs. The combining means is adapted to compare: (1) the output of the phase-shifting amplifiers and the input to those amplifiers when the amplifiers are connected in cascade, and (2) the output of one such amplifier and the output of the other such amplifier when the said amplifiers are connected in parallel. A phase-sensitive null detector is used for satisfying each of the following four conditions. First, the amplifiers are connected in cascade and the amplifier gains K1 and K2 are adjusted to make $K1.K2=1$. Second, the amplifiers are connected in parallel and their gains are adjusted to make $K1=K2$. Third, the amplifiers are connected in cascade and their phase shifts are adjusted to make $\theta 1+\theta 2=180$ degrees. Fourth, the amplifiers are connected in parallel and their phase shifts are adjusted to make $\theta 1=\theta 2$. By satisfying the above conditions simultaneously, each amplifier produces a phase shift of exactly ninety degrees. Therefore, a pure and precise quadrature output voltage is available at the output of each amplifier, either one then being employed to supply the quadrature signal to the following circuit or the utilization device.

In the drawings,

FIG. 2 is a simplified schematic diagram explaining one set of calibrating conditions for the system such as shown in FIG. 1.

FIG. 3 is a simplified schematic diagram explaining a second set of calibrating conditions for the system shown in FIG. 1.

FIG. 4 is a simplified schematic diagram explaining the actual operating conditions for the finally calibrated system.

Figure 1:
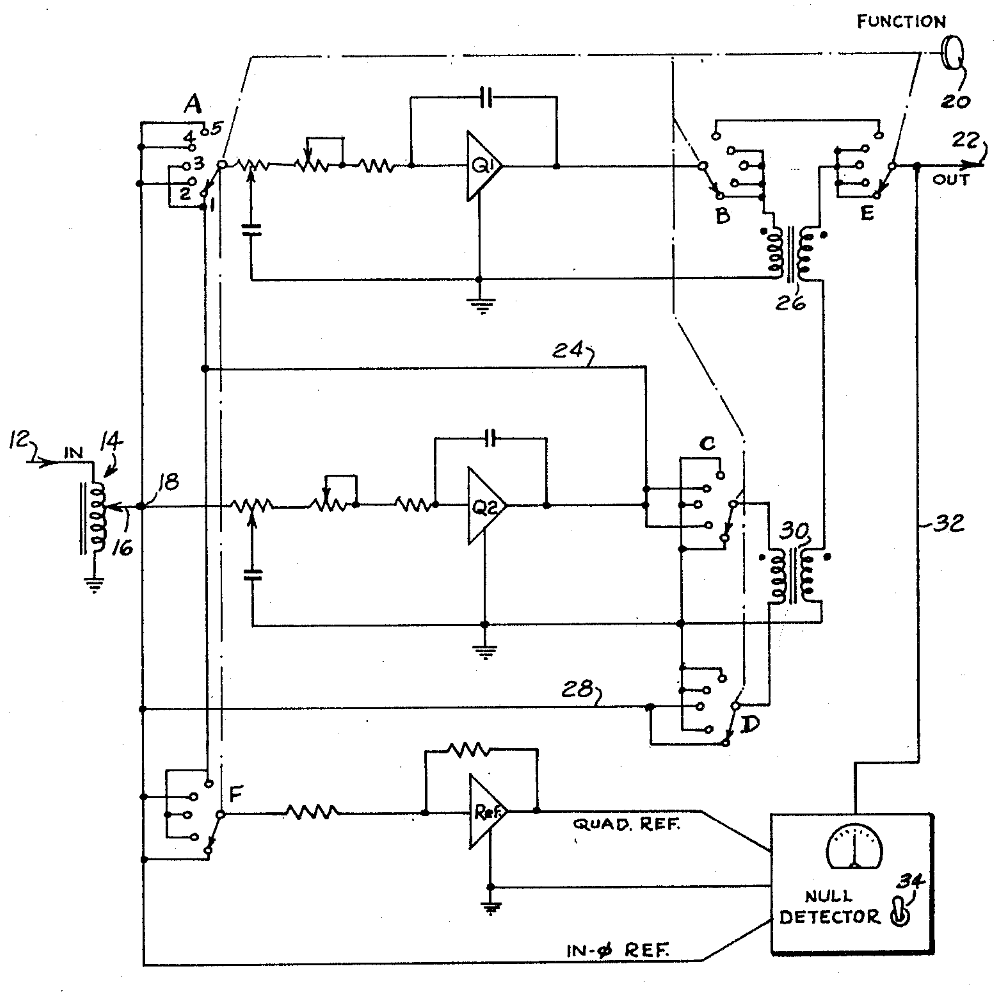
FIG. 1 is a simplified block diagram of a preferred system according to the present invention.

Referring first to the block diagram of FIG. 1, 12 is the input terminal (reference ground) of a quadrature voltage standard according to the invention. An alternating voltage having a frequency within the range of the instrument is supplied to the terminal 12; this constitutes the input signal from which it is desired to establish an identical signal in quadrature relationship thereto.

An autotransformer 14 is connected across the input for dividing down the voltage input to an appropriate value for the instrument. An adjustable switch arm or slider 16 applies the alternating signal voltage of suitable amplitude to a terminal 18. The terminal 18 is a common input terminal for amplifiers now to be described.

First and second integrating amplifiers Q1 and Q2 are shown in FIG. 1. The second amplifier Q2 and its components are substantially identical with the first amplifier Q1 and its components. Therefore, primed reference numerals are used in referring to the amplifier Q2, but the amplifier Q2 need not be described specifically.

The phase shifting amplifiers have approximately unity gain, but their gains are independently adjustable through a small range. The reason for this gain adjustment, which is not itself inherently required to satisfy the quadrature-determining relationships, is that the latter require the use of a phase-sensitive null indicator of a type well known in the art, and which is subject to saturation if there is a large gain difference between the two phase-shifting amplifiers. This would reduce the sensitivity of the indicator and obscure the phase nulls, which result can be prevented by adjusting the gains to be at the unity value before proceeding with the phase adjustments.

It is recognized that a properly designed integrating amplifier will theoretically produce an output displaced in phase by very close to 90 degrees from its input. However, and in practical cases, there will in fact be an angular error whose size is a function of the ratio of the open-loop gain to the closed-loop gain, distributed capacity, and other factors, such as the fact that the open-loop gain cannot itself be actually infinite and the fact that "pure" capacity (that is, perfectly free from associated resistance) cannot be achieved. The invention being described herein includes circuitry, and an operating procedure, by which complete compensation for such errors is obtained.

It may be mentioned here that while the phase-shift amplifier Q1 and Q2 are described as integrators, the invention in its broader aspects is applicable also to the use of differentiating amplifiers. However, for various practical reasons including the fact that the gain of an integrating amplifier is inversely proportional to frequency, so that its use tends to minimize harmonic distortions, the integrating amplifier is preferred and will be described.

Returning now to FIG. 1, the input signal of selected amplitude at point 18 is distributed to the proper combination of Q1, Q2 and the Ref amplifier by ganged five-position switches controlled by the switch knob 20. Corresponding switch contacts will be designated by a capital letter for the particular switch followed by a digit 1 . . . 5 indicating the contact positon.

The contact position 1 (shown in FIGS. 1 and 5) connects Q1 and Q2 in series (cascade), compares their combined output with the input, and applies any difference signal to the null indicator along with an in-phase reference signal, for relative gain adjustment of Q1 and Q2 to achieve a gain-product of unity.

Contact position 2 connects Q1 and Q2 in parallel at the inputs, compares their outputs, and applies any difference signal to the null indicator along with a quadrature reference signal; the gains are then readjusted (simultaneously in opposite directions) to achieve a gain-difference of zero.

Contact position 3 again connects Q1 and Q2 in series, like position 1, but supplies a quadrature reference signal to the null indicator, for relative phase adjustment of the integrators to obtain a phase null.

Contact position 4 connects Q1 and Q2 in parallel at their inputs, and applies any difference signal at their inputs to the null indicator along with an in-phase reference signal; the phase controls of Q1 and Q2 being then adjusted in opposite directions for a null indication.

These four calibration steps may have to be repeated for fine adjustments (due to interactions) to ensure that a null is indicated for each condition. When completely adjusted, the function switch is set on position 5, and Q1 supplies the desired output, at lead 22, which is a signal in quadrature with the input to within 0.01 degree of phase angle.

*Frist calibrate position*

It is unnecessary to trace in detail the various circuits for all the switch positions, but the particular connection shown in FIG. 1 will be explained, and references then made to the way in which significantly different connections are achieved by other position settings. Thus, in position 1, the signal path is from input 18 to integrator amplifier Q2, and over conductor 24 to A1, through integrator Q2 to B1 which applies to the primary of comparing transformer 26 the cascade output signal. The input from 18 is also applied over conductor 28 and D1 (C1 being grounded) to the primary of comparing transformer 30. The outputs or secondary winding signals of 26 and 30 are thus connected in subtracting relation, and the difference signal is applied at E1 to the null detector input over conductor 32.

The in-phase reference signal is applied to the null indicator from terminal 18 over F1 via the reference amplifier. The manual "In-Phase—Quadrature" switch 34 of the null indicator is not required to be operated during the calibration of the quadrature generator, since switch F makes the proper selection as between an in-phase and quadrature reference signal for each step. The switch 34 is used in the adjustment of the internal gain and phase controls of the null indicator as a preliminary alignment thereof in a manner familiar to those using such indicators.

In the first switch position, then the equivalent block diagram is as represented in FIG. 2 of the drawings, the legend "CAL. POS. A" referring to the cascaded-integrator arrangement which will also be used in switch position 3. Since in position 1 the null indicator receives an in-phase reference signal as described above, and each integrator introduces a nominal 90 degree phase shift, the output signal of Q1 will be about 180 degrees away from the input at Q2, and due to the polarity reversing connection between the secondary windings of transformers 26 and 30 (note polarity dots at their terminals) the output at 32 will be in phase with the input, and of amplitude K1 times K2, assuming unity input amplitude E at 14. Any indication at the null detector (other than a fortuitous zero) indicates a gain product of other than unity, so the gain controls of Q1 and Q2 must be adjusted together (i.e., simultaneously in the same sense or direction) to achieve a null indication and establish $K1 \times K2 = 1$. As will appear, this is a tentative adjustment, subject to alteration in the next calibrating step.

*Second calibrate position*

With the ganged function switch in its second position, the equivalent block diagram is as shown in FIG. 3, which will also apply to the fourth position. The integrators are paralleled at their inputs, each introducing a nominal 90 degree phase shift at its transformer primary. The secondaries are now connected in relatively reversed polarity, and the output at 32 will be $K1 - K2$ (again assuming unity input amplitude). It has already been established that $K1 \times K2 = 1$, so any output indication at the null detector reveals a difference in the two gains. Since the signal applied to the detector is now in quadrature with the input at 18, a quadrature reference signal for the null indicator is required. If K1 and K2 are unequal but have a product of unity, one is too small and the other too high, so the integrator gain controls are now adjusted simultaneously in opposite senses until a null is indicated.

Returning now to FIG. 1, the detailed connection changes will be obvious for this second switch position. Input from 18 reaches Q2 directly, and reaches Q1 over contact A2. There is no input to Q1 over lead 24, but the output of Q2 passes to transformer 30 at C2, the other terminal of the primary being grounded at D2. The lower secondary terminal of 30 is always grounded, and in position 2 the series-connected secondaries have their output connected at E2 to null-indicator input lead 32, as required. It will be noted that while FIGS. 2 and 3 indicate that it is the transformer secondaries which are switched. for clarity, the same result is obtained by switching their primaries as in FIG. 1. The necessary quadrature reference input to the null indicator is obtained from the output lead 24 of Q2 over contact F2.

When the relative gains of Q1 and Q2 have been adjusted for a null output, so that $K1 = K2$, it is advisable to repeat the previous (first) calibration step, using a vernier gain control on each integrator, to avoid any effect of interaction of step 2 on the integrators. Step 2 can then be repeated, adjusting the gain verniers in opposite directions. The final adjustment will produce a null in both of the ganged switch positions.

*Third calibrate position*

In this positon, the cascade connection of the integrators as in FIG. 2 is obtained, but the null indicator receives a quadrature reference signal at F3 as in step 2. An error signal will appear at the indicator unless the sum of the integrator phase angles is 180 degrees. Therefore, the integrator phase controls are adjusted in the same direction simultaneously to obtain a null indication, whence the sum of the integrator phase shifts becomes 180 degrees.

Note in FIG. 1 that lead 24 again connects the Q2 output to the Q1 input at A3, and the transformer connections at B3, E3, C3, and D3 are the same as in the first calibrating condition, but F3 supplies a quadrature reference voltage to the null indicator.

*Fourth calibrate position*

In this final calibration step, the function switch is set in its fourth position, providing a parallel connection of the integrator inputs, as in FIG. 3, but an in-phase reference signal is supplied to the null indicator at contact F4 in FIG. 1. The integrator and transformer connections at contacts A4, B4, C4, D4 and E4 are the same as in the second calibration step. It is already known that, in series, the summed phase shifts of the integrators (from step three) is 180 degrees; an error signal in the parallel connection must now be the result of a difference in the individual shifts of the integrators, meaning that one must be less than 90 degrees and the other greater. Hence a null is obtained by simultaneously adjusting the phase controls of the integrators in opposite directions or senses. Since interaction may again have disturbed the position 4 adjustment, step 3 and step 4 are preferably repeated until a null indication is obtained in both of these positions.

*Operating position*

In the fifth or operating condition of the apparatus, the function switch is operated to place the ganged function switch contacts at their uppermost or fifth positions. Reference to FIG. 1 will show that the input signal at 18 passes directly to integrator Q1 at contact A5, and the output of the integrator Q1 passes at B5 and E5 to the useful-output terminal 22. Switch contacts C5 and D5 merely short-circuit the primary of transformer 30, but the secondaries of the transformers are disconnected from the output terminal by Switch E. This "operating" position is diagrammed in FIG. 4.

As a result of the four calibration steps, it is known that the integrator phase shifts are equal, and add up to 180 degrees, which can only be true if both are precisely 90 degrees. It may be mentioned here that this phase relation does not, as a theoretical matter, require that the gains of the two integrators be equal to unity. However, there are two practical reasons for such adjustments of the integrator gains. First, available null indicators or detectors are very sensitive to overloading or saturation, and the unity gain adjustments ensure against such a result with consequent degradation of the sensitivity of the indicator. Second, the unity gain adjustment of Q1 provides that the useful output signal will have the same amplitude as the input signal at point 18, which is a convenience in some applications.

*Accuracy considerations*

The available precision of the instrument as a quadrature generator depends upon the null detector sensitivity and the equality of the phase characteristics of transformers 26 and 30. Available phase-sensitive null detectors, known to those skilled in the art, will indicate a phase difference as small as 0.001 degree, with a 5 volt (R.M.S.) input signal and a sensitivity of 100 microvolts. The phase inverting transformers 26 and 30 can readily be built and adjusted to have individual phase errors of about 0.05 milliradian, or 0.003 degree at 400 cycles per second. What is more important with respect to the present invention is the difference in their phase errors, which will be considerably less, or approximately 0.001 degree. Individual phase errors of the two transformers cancel one another with respect to the series and cascade connections of the two integrators, and do not contribute any error to the finally established quadrature relationship between the input signal and the output signal of the quadrature generator as a whole.

From the standpoint of the input at 12 (rather than that at 18) there is a possibility of a phase error also. However, a precision autotransformer 14 will give an error not exceeding 30 micro-radians, or about 0.001 degree.

*Detailed connection of parts*

Figure 5:
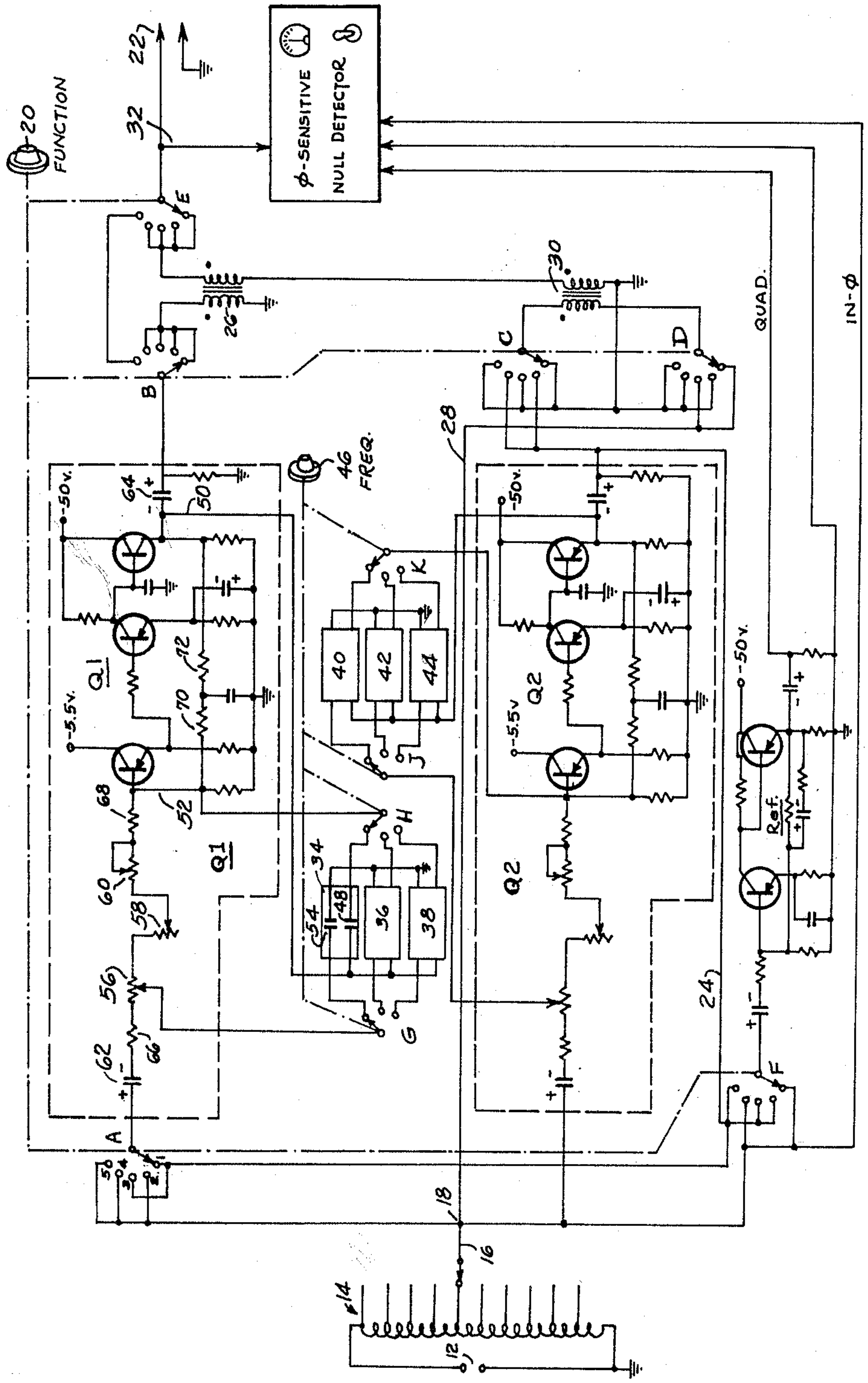
FIG. 5 is a detailed wiring schematic of the complete apparatus.

While there are various ways in which one can provide the finely adjustable integrators (or differentiators) Q1 and Q2, so that they can readily be constructed using designs of which the prior art affords examples, a detailed schematic of a complete quadrature generator in accordance with the invention is given in FIG. 5. The integrators Q1 and Q2 are identical, and each is provided with a set of three networks 34, 36 and 38 and 40, 42 and 44, the appropriate network for each being selected by the ganged range switches G, H, J and K. The purpose of this switching, which is controlled by the "frequency" control 46, is to insert in each integrator suitable values of capacitance for three different input signal frequencies, for example at useful frequencies lying in the range of from 150 to 3,000 cycles per second. The use of plug-in networks 34 to 44 enables the user to adapt the equipment to any selected frequencies that he may encounter, it being understood that the actual input frequency may vary as much as + or −5% of the nominal center frequency without serious error. In network 34, by way of example, capacitor 48 is the main feedback capacitor which connects the Q1 output at 50 to its input at 52. Capacitor 54 of network 34 is connected between ground and the slider of phase-adjusting potentiometer 56. The rough gain adjustment for Q1 is variable resistor 58, and a fine or vernier adjustment of gain is provided by potentiometer 60. The A.C. signal input to Q1 is coupled through capacitor 62, and the output signal is coupled to the tap of switch B at capacitor 64.

Any form of integrating (or, as indicated earlier, differentiating) phase shift amplifier capable of attaining a 90 degree phase shift may be provided at Q1 and Q2. The considerations underlying the design of such circuits are discussed at length in Korn & Korn, "Electronic Analog Computers," McGraw-Hill, 1952, beginning at page 129. The transistor circuits shown are integrators of the parallel feedback type, in which the resistance corresponding to the resistor of a simple passive RC integrating circuit is represented by the aggregate of resistors 56, 58, 60, 66 and 68, while the corresponding capacitance is represented by 48. The parallel feedback resistance is represented by resistors 70 and 72. The transistors are direct-coupled and thus provide equivalent D.C. gain tending to neutralize the charge applied to the feedback capacitor by the input signal, in the usual manner of such integrators. A detailed explanation of the requirements to be satisfied by such integrators begins at page 138 of the cited textbook.

The invention is not to be understood as limited to the details of the disclosed circuitry or procedures, except as required by the scope of the appended claims.

What is claimed is:

1. A quadrature generator for generating at output terminals thereof an A.C. output signal which is a replica of an A.C. input signal applied to input terminals thereof, but phase shifted precisely 90 electrical degrees, comprising:

(*a*) a pair of phase-shift amplifiers independently adjustable as to phase shift through the 90-degree shift value, (*b*) switch means interconnecting said amplifiers selectively in cascade or in parallel between the input and output terminals of the generator, and (*c*) a voltage null indicator connected to the output terminals of said generator.

2. A quadrature generator in accordance with claim 1, in which said null indicator is a phase-sensitive null indicator, and including (*d*) a switch ganged with said switch means (*b*) for applying to said phase-sensitive null indicator a reference signal which is selectively in phase conjunction or in phase quadrature with reference to the generator input signal.

3. A quadrature generator in accordance with claim 2, in which said phase quadrature reference signal is derived from the output end of one of said amplifiers.

4. A quadrature generator in accordance with claim 1, including (*e*) a pair of accurately matched transformers, and (*f*) further switch means for applying to the primaries of said transformers the output signals of said amplifiers, selectively in aiding or opposing relationship to one another, and for simultaneously interconnecting the secondaries of said transformers in series with the output of said generator.

5. A quadrature generator in accordance with claim 1, in which said phase-shift amplifiers are integrating amplifiers.

6. A quadrature generator in accordance with claim 1, in which each of said amplifiers includes means for adjusting its gain over a range including the unity gain value.

7. The method of generating from an A.C. input signal an output signal which is precisely in phase quadrature relation thereto, comprising the steps of (*a*) applying said input signal in succession to a pair of adjustable quadrature phase shift circuits connected successively in parallel and in cascade with one another, (*b*) separately adjusting said circuits to obtain from their combined outputs a null indication for each of the successive signal applications of step (*a*), and thereafter (*c*) deriving the desired output signal from a single one of the thus-adjusted phase shift circuits.

8. The method of generating from an A.C. input signal an output signal which is precisely in phase quadrature relation thereto, comprising the steps of (*a*) applying said input signal in succession to a pair of adjustable quadrature phase shift amplifiers connected successively in parallel and in cascade with one another, (*b*) separately adjusting said amplifiers to obtain from their combined outputs a null indication for each of the successive signal applications of step (*a*), and thereafter (*c*) deriving the desired output signal from a single one of the thus-adjusted amplifiers.

9. The method of generating from an A.C. input signal an output signal which is precisely in phase quadrature relation thereto, comprising the steps of (*a*) applying said input signal in succession to a pair of adjustable quadrature phase shift amplifiers connected successively in parallel and in cascade with one another, (*b*) separately adjusting the gains of said amplifiers to values of substantially unity, (*c*) separately adjusting the precise phase shifts of said amplifiers to obtain from their combined outputs a null indication for each of the successive signal applications of step (*a*), and thereafter (*d*) deriving the desired output signal from a single one of the thus-adjusted amplifiers.

References Cited by the Examiner

UNITED STATES PATENTS

| | | | |
|---|---|---|---|
| 2,481,492 | 9/49 | Bjarnason | 324—83 |
| 2,749,502 | 6/56 | Ragazzini et al. | 323—119 X |
| 2,857,568 | 10/58 | Hering et al. | 324—83 X |
| 3,022,459 | 2/62 | Alper | 324—83 |

References Cited by the Applicant

UNITED STATES PATENTS

| | | |
|---|---|---|
| 2,984,799 | 5/61 | Gerks. |

WALTER L. CARLSON, *Primary Examiner.*

UNITED STATES PATENT OFFICE
CERTIFICATE OF CORRECTION

Patent No. 3,184,681 May 18, 1965

Richard M. Bloniarz

It is hereby certified that error appears in the above numbered patent requiring correction and that the said Letters Patent should read as corrected below.

Column 1, line 29, for "it" read -- is --; column 3, line 21, for "inputs" read -- outputs --; line 31, for "Frist", in italics, read -- First --, in italics; same column 3, line 40, for "Q2" read -- Q1 --.

Signed and sealed this 16th day of November 1965.

(SEAL)
Attest:

ERNEST W. SWIDER
Attesting Officer

EDWARD J. BRENNER
Commissioner of Patents